US007720354B2

(12) United States Patent
Geier et al.

(10) Patent No.: US 7,720,354 B2
(45) Date of Patent: May 18, 2010

(54) EMBEDDED ACCESS INFORMATION FOR DIGITAL VERSATILE DISC (DVD) INDEPENDENT OF DVD PLAYER SOFTWARE

(75) Inventors: Freddie Geier, Cupertino, CA (US);
Stefan Bauer-Schwan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1714 days.

(21) Appl. No.: 09/755,627

(22) Filed: Jan. 4, 2001

(65) Prior Publication Data

US 2002/0085836 A1 Jul. 4, 2002

(51) Int. Cl.
*H04N 5/91* (2006.01)
*H04N 5/00* (2006.01)
*H04N 7/173* (2006.01)

(52) U.S. Cl. .................. 386/95; 396/125; 396/126; 725/109

(58) Field of Classification Search .............. 386/46, 386/125–126, 83, 95; 725/110, 109, 113, 725/115
See application file for complete search history.

(56) References Cited

U.S. PATENT DOCUMENTS

| 5,889,515 | A  | * | 3/1999  | McDade et al. | 715/255 |
| 6,272,625 | B1 | * | 8/2001  | deCarmo | 712/245 |
| 6,496,847 | B1 | * | 12/2002 | Bugnion et al. | 719/321 |
| 6,580,870 | B1 | * | 6/2003  | Kanazawa et al. | 386/125 |
| 6,802,022 | B1 | * | 10/2004 | Olson | 714/6 |
| 2002/0007493 | A1 | * | 1/2002 | Butler et al. | 725/110 |

* cited by examiner

*Primary Examiner*—Vincent Boccio
(74) *Attorney, Agent, or Firm*—Buchanan Ingersoll & Rooney PC

(57) ABSTRACT

An operating system extension is used to implement embedded information on a DVD. The operating system extension examines DVD sector addresses requested from the DVD hardware. When address associated with an embedded link is requested, an application program that can run the embedded link is started, and the embedded link is provided to the application program. The system of the present invention has the advantage that it does not require modifying the DVD software program and thus can be used with a variety of different DVD software programs.

8 Claims, 4 Drawing Sheets

EMBEDDED ACCESS INFORMATION FOR DIGITAL VERSATILE DISC (DVD) INDEPENDENT OF DVD PLAYER SOFTWARE

BACKGROUND OF THE PRESENT INVENTION

The Digital Versatile Disc (DVD) is a high-capacity multimedia data-storage medium designed to accommodate a complete movie on a single disc, content-rich multi-media or very high-quality multi-channel audio. DVDs have become quite popular, the market for DVD having grown faster than compact discs (CDs) or VHS video cassettes did during their first two years. The most popular of the DVD formats is the DVD-VIDEO format, which is a format for video content which can be played on domestic DVD players and DVD-ROM drives. The DVD-ROM format is for delivering data and multi-media content which can be played by computers equipped with DVD-ROM drives.

DVD-ROM drives are becoming quite popular and are now standard on many high-end computers. Typically, the DVD-ROM hardware is accessed by the peripheral device access functions of the operating system. The data from the DVDs is provided to DVD player software. The DVD player software allows the computer user to access the various content of the DVD. One popular use of DVDs for computer-based systems is for displays and presentations by companies to potential customers and employees.

The DVD players and discs operate in accordance with the official DVD specification, currently the DVD video specification version 1.1. The official specification was developed by a consortium of ten companies: Hitachi, JVC, Matsushita, Mitsubishi, Philips, Pioneer, Sony, Thomson, Time Warner, and Toshiba. Representatives from many other companies also contributed in various working groups. In May 1997, the DVD Consortium was replaced by the DVD Forum, which is open to all companies, and as of February 2000 had over 220 members.

A difficulty with DVD systems is that they do not allow access to information other than that stored on the DVD. Once a DVD is produced, the content of the DVD can not be updated.

It is desired to have an improved DVD system that allows access to the information not stored on the DVD itself.

SUMMARY OF THE PRESENT INVENTION

The present invention uses embedded information in DVDs to obtain resources outside of the DVD. The embedded information preferably uses use resource indications such as Uniform Resource Locators (URLs) or a file indications. The resource indication is used by an application program to access the resource. This resource (such as a web page) can contain the most current information.

In a preferred embodiment, the embedded information is supported by the operating system, preferably an extension to the operating system. The operating system, in a preferred embodiment, checks the DVD for resource indications and associated sector address regions when the DVD is placed into the hardware player. The resource indications and associated sector address regions are preferably stored in a portion of a DVD file, such as the Video Title Set navigation information file—"VIDEO_TS.IFO". The resource indications and associated sector address regions are stored on the DVD in a manner that they are ignored by systems that do not support embedded information. In one embodiment, the resource indications and associated sector address regions are stored in a vendor specific field of a text portion of the file. Other DVD players will not access this vendor specific field.

When the DVD is played, the operating system examines all requested sector addresses of DVD data for addresses associated with one of the resource indications. If an association is found, the operating system starts an application program and provides the one of the resource indications to the application program to obtain a resource. Since the requested address are examined by the operating system, the starting and resource-indication-providing steps need not done under the control of DVD player software.

Having the operation of the system of the present invention independent of the control of a DVD player software is advantageous. One way to support embedded information for DVD is to have the DVD player software modified to support such embedded information. The problem with modifying the DVD player software is that it requires such DVDs with embedded information to be used only with the DVD player software systems that support embedded information. Thus the embedded-link system would not work with all of the DVD player software that supports the DVD specification. By using operating system software, in particular operating system extension software, this problem is avoided. The system of the present invention can be used with a variety of different DVD player software systems without requiring any modifications to the DVD player software.

In one embodiment, the resource indication is stored in a text portion of the DVD and associated with a sector address range on the DVD. When the operating system requests DVD data from a sector address range, the operating system starts the application program and provides the resource indication to the application program to obtain the resource. This operation can be done at any time during the operation of the DVD.

DETAILED DESCRIPTION OF THE PREFERRED EMBODIMENT

Figure 1:
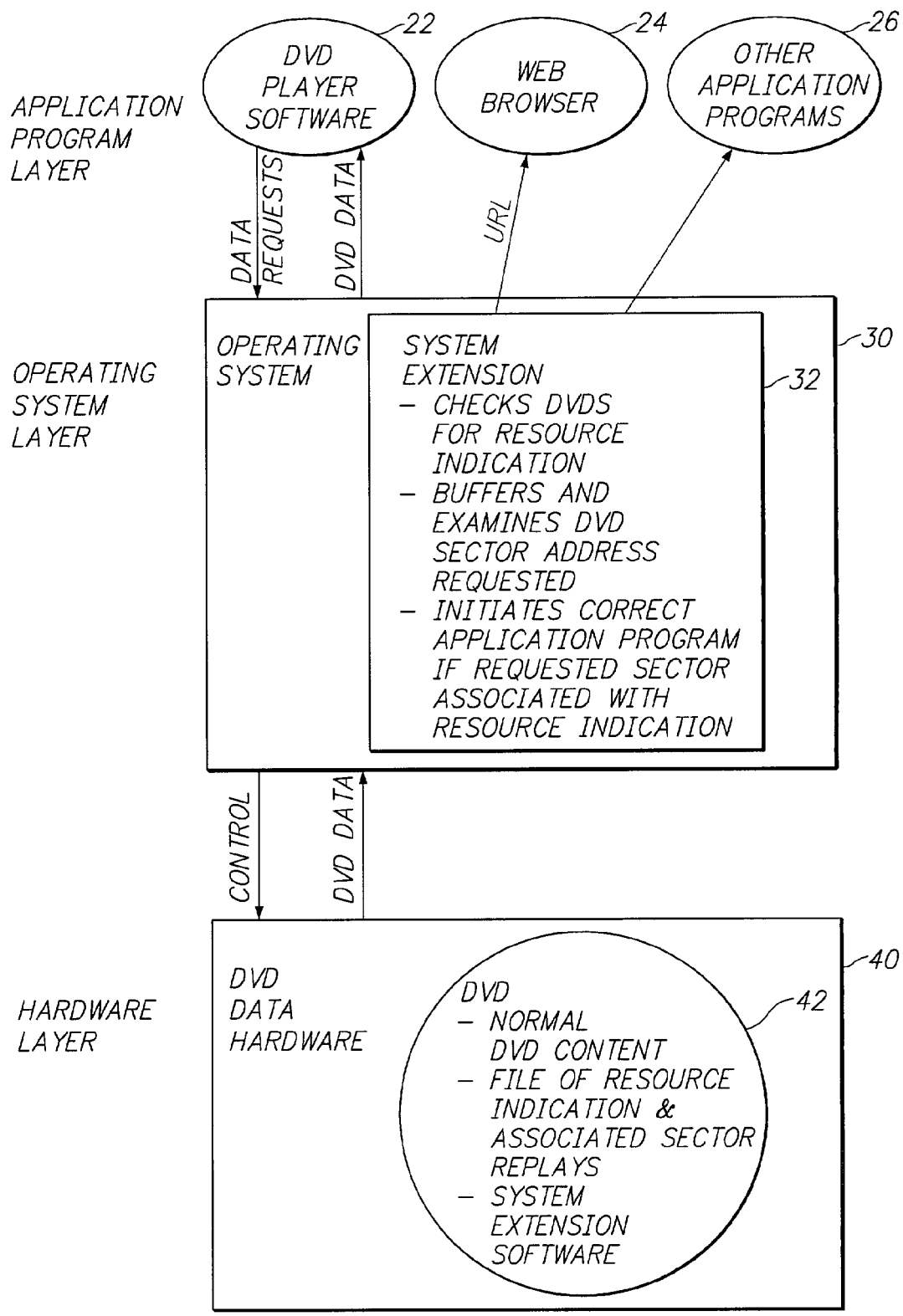
FIG. 1 is a diagram of one embodiment of the system of the present invention.

FIG. 1 shows the application program layer with the DVD player software 22, web browser 24 and other application programs 26 operably connected to the operating system 30. The operating system 30 is operably connected to the DVD hardware 40. The DVD player software 22 initiates data requests to the operating system 30. The operating system 30 uses control signals sent to the DVD data hardware to obtain data from the DVD 42. This DVD data is sent from the DVD data hardware 40 to the operating system 30 that provides it to the DVD player software 22. The DVD discs, player hardware, and player software operate in accordance with the official DVD specification.

In the preferred embodiment of the present invention, the operating system includes an operating system extension 32. The operating system extension 32 can be, for example, a dynamically loaded library, driver or other unit. The operating system extension 32 examines the DVD data sector address for sectors associated with resource indications. A buffer is used by the operating system to store the address requested from the DVD data hardware 40. The system extension software 32 periodically examines these buffered addresses to determine whether there are any addresses that correspond to a resource indication, such as a URL. If the DVD player software 22 requests DVD data associated with a resource indication, the system extension software 32 starts an application program which then receives the resource indication. In one embodiment, the resource indication is a URL which is provided to a web browser 24. Alternatively, the resource indication can point to any other type of resource. For example, the resource indication could be a file indication that brings up data stored in a file of the computer or network.

The advantage of having the operating system examine the DVD addresses is that the DVD player software 22 need not be modified to support the obtaining of content external to the DVD.

In one embodiment, before the DVD is played, the system extension software 32 checks the DVD for the existence of any resource indication. In a preferred embodiment, the DVD 42 stores within a text region a list of the different resource indications and an indication of the associated DVD sector address ranges in which these resource indications are embedded.

In one embodiment, the URLs and indication of the associated sector address are encoded in the text of a DVD disc file that is examined by the system before playing the DVD. In one embodiment, the Video Title Set navigation information file—"VIDEO_TS.IFO"—defined by the official DVD specification is used. The Video Title Set navigation information file contains the menu information that is brought up when a DVD disc is loaded into the machine. In one embodiment, the indication of the sector address is a DVD menu location from which the sector address range is determined. The text stored in the file is preferably encoded to allow all possible characters to be expressed. The resource indications and associated sector address regions are stored on the DVD in a manner that they are ignored by systems that do not support embedded information. In a preferred embodiment, the resource indications and associated sector address regions are stored in a vendor specific field of a text portion of the DVD file. Other DVD players will not access this vendor specific field.

In one embodiment, the requested addresses are buffered before examination. The short delay in starting up the web browser 24 or other application program 26 will not be significantly noticeable.

If there are no resource indications stored in the specific DVD text region, the system extension software 32 does not buffer and examine the addresses requested from the DVD hardware 40. This prevents the system extension software 32 from unnecessarily taxing processor resources.

In a preferred embodiment, the DVD 42 contains the system extension software. When the DVD 42 is first run, the system extension software is loaded into the operating system 30. The system extension software 32 need only be loaded once to implement the embedded resource links. In one embodiment, system extension software for multiple common operating systems is stored on the DVD. In one embodiment, system extension software programs for Apple operating systems and/or Microsoft Windows-based operating systems are stored on the DVD 42.

Figure 2:
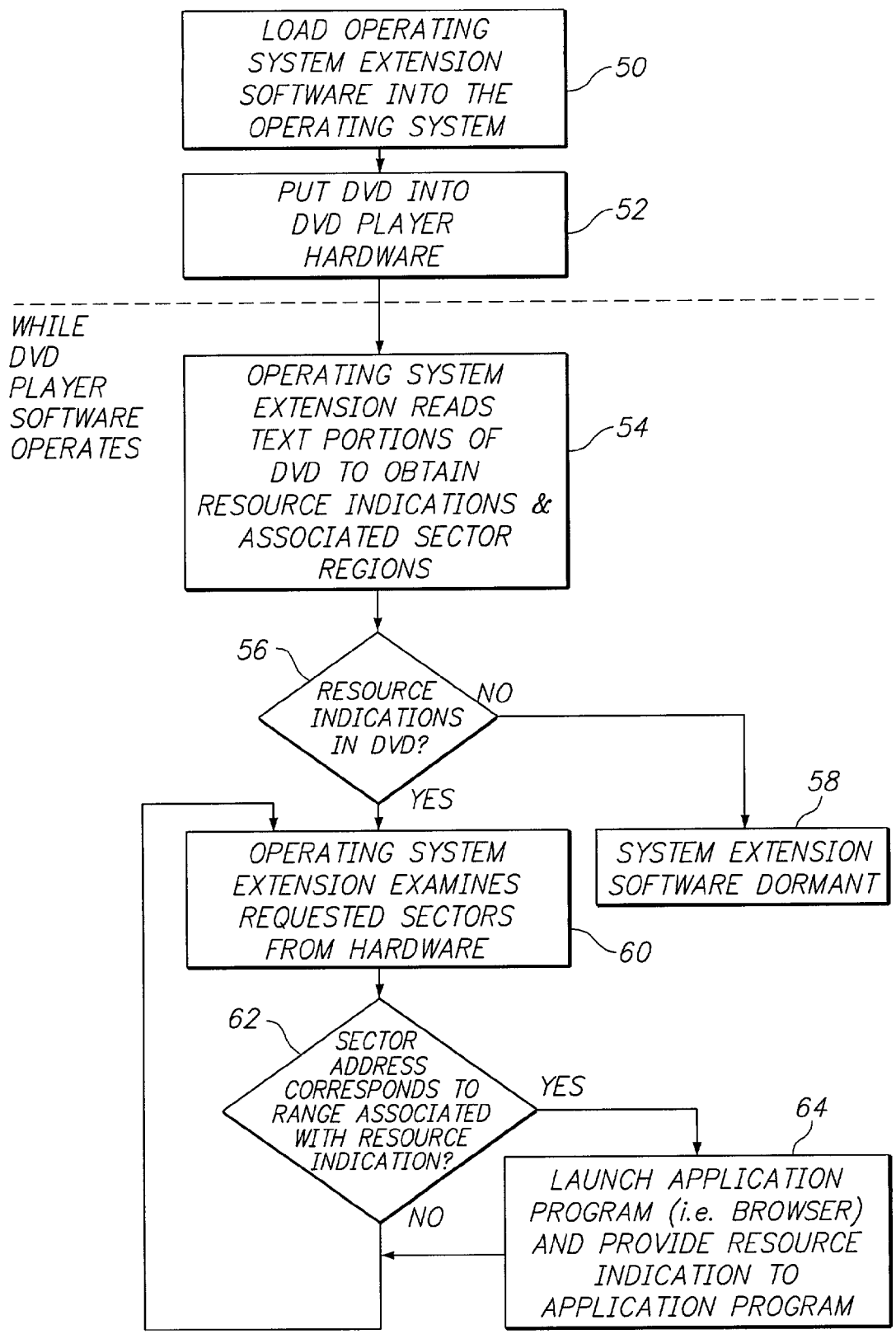
FIG. 2 is a flow chart illustrating a method of one embodiment of the present invention.

FIG. 2 is a flow chart that illustrates the method of the present invention. Step 50 comprises loading the operating system extension software into the operating system. In one embodiment, the system extension software on the DVD is loaded into the operating system. Upon restart of the computer, the system extension software will be part of the operating system. In step 52, a DVD is placed into the DVD player hardware.

In step 54, the operating system extension software reads a text portion of the DVD to obtain the resource indication on and associated sector address ranges. Alternatively, the type of application program can be implicit in the resource indication. For example, a URL indication can cause a web browser to start.

In step 56, it is checked whether any embedded information is stored in the DVD. If not, the system extension software lays dormant in step 58. This prevents the system extension software from taxing the resources of the computer when the DVD does not have any embedded resource indications.

If there are resource indications in the DVD, in step 60, the operating extension examines addresses requested from the DVD player software. The requested addresses are preferably buffered. In step 62, it is checked whether the address corresponds to a resource indication. In one embodiment, this correspondence is indicated by the requested sector addresses matching the sector addresses associated with the resource indication. If there is a match, in step 64, the application program is started and the resource indication is provided to the application program to obtain the resource. The operating system extension continues to examine the data sector addresses requested while the DVD player hardware operates.

Figure 3:
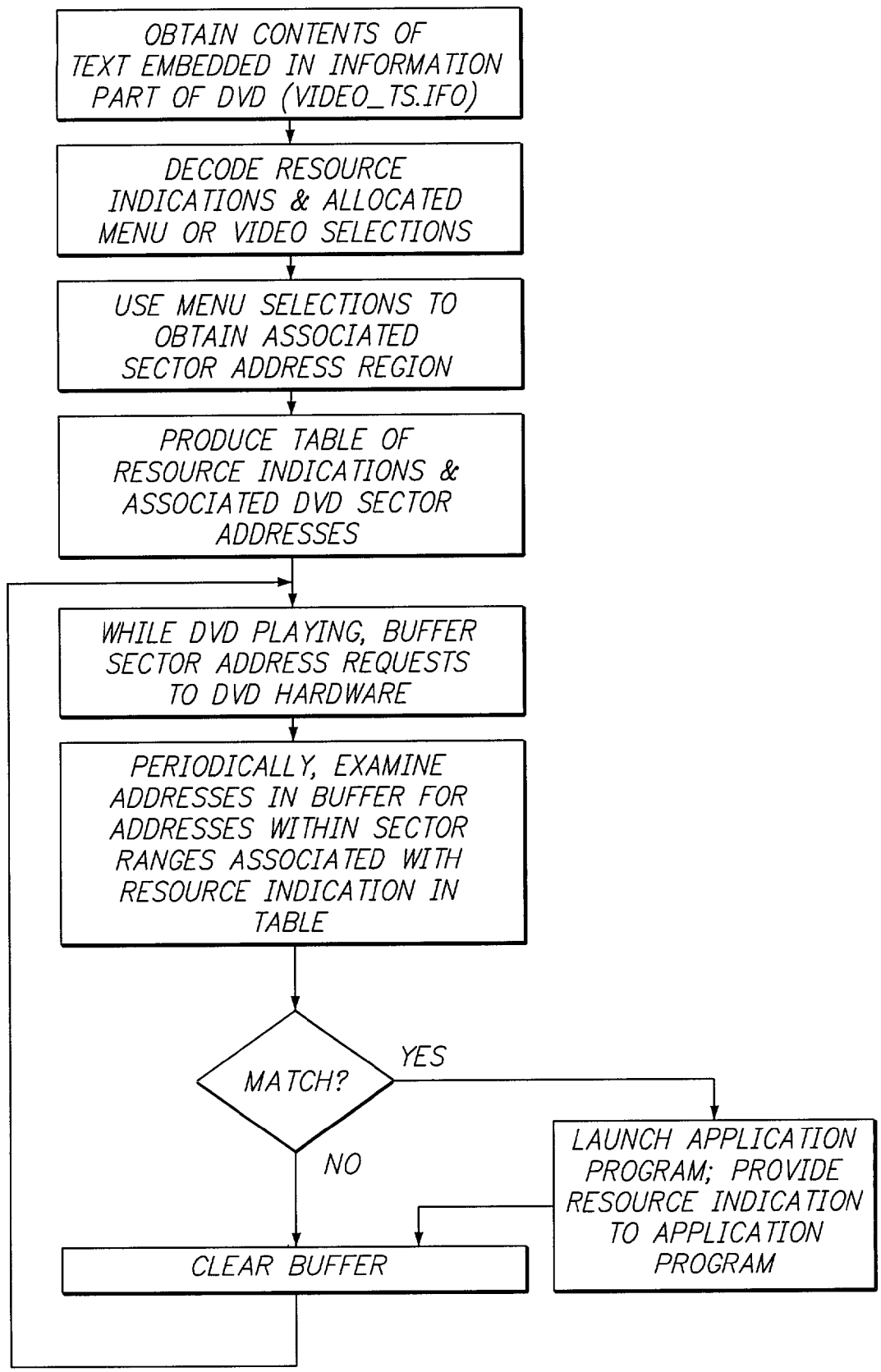
FIG. 3 is a flow chart illustrating one embodiment of the system of FIG. 2 using a DVD sector address buffer.

FIG. 3 is a flow chart illustrating one embodiment of the system of FIG. 2 using a DVD sector address buffer.

Figure 4:
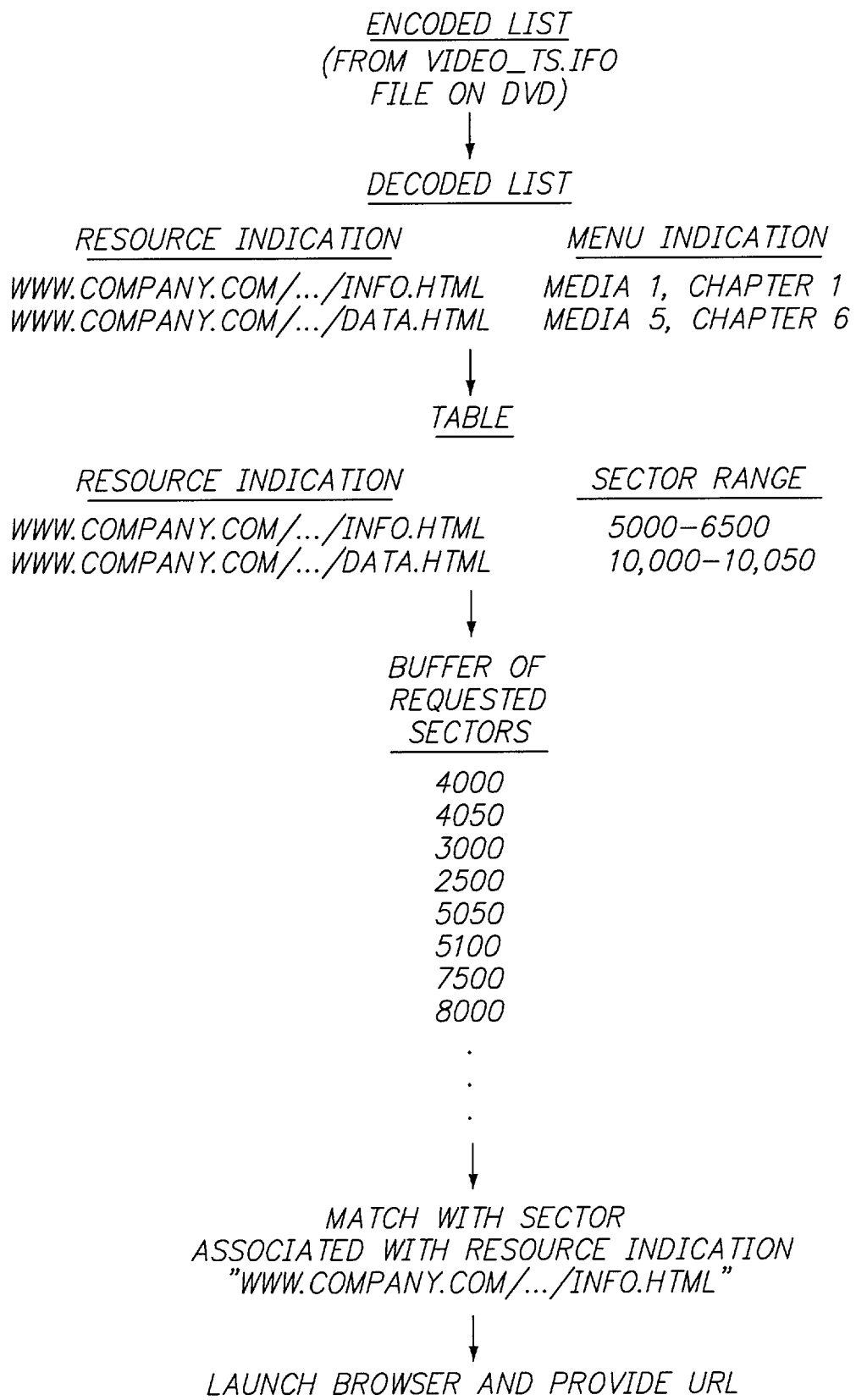
FIG. 4 is a diagram of an example of the method of FIG. 3.

FIG. 4 is a diagram of an example of the method of FIG. 3.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

The invention claimed is:

1. In a computer system having hardware for retrieving data from a multi-media data storage medium, player software that issues requests to obtain data from a multi-media data storage medium, an operating system that is responsive to the requests from the player software to control the hardware to retrieve selected data from a multi-media data storage medium and provide the retrieved data to the player software, and an application program configured to retrieve indicated resources, a method comprising the following steps:

reading data, by the hardware, in sector address regions of a multi-media data storage medium;

identifying resource indications in the data read from the storage medium by the hardware, and sector address regions on the medium that are associated with the resource indications;

storing the identified resource indications and their associated sector address regions;

in response to a request from the player software to the operating system to retrieve data from a specified address region on the medium, during playback of information recorded on the medium, comparing the specified address region with the stored sector address regions to determine whether the specified address region on the medium is associated with an identified resource indication; and if the specified address on the medium is associated with an identified resource indication, providing the associated resource indication from the operating system to the application program, to cause the application program to access the indicated resource.

2. The method of claim 1, wherein the identifying, storing, comparing and providing steps are performed by an operating system extension.

3. The method of claim 2, wherein the operating system extension is recorded on the storage medium for loading onto the computer when the storage medium is accessed by the hardware.

4. The method of claim 1, wherein the resource indications are Uniform Resource Locators (URLs).

5. The method of claim 1, wherein the storage medium is a digital versatile disk (DVD).

6. The method of claim 5, wherein the address region is stored on the DVD as a DVD menu indication.

7. The method of claim 1, wherein the resource indication is a file indication.

8. The method of claim 1, wherein the operating system stores the addresses requested from the player hardware in a buffer, and the operating system examines the buffer for addresses corresponding to a resource indication during the comparing step.

* * * * *